United States Patent [19]

Numata et al.

[11] Patent Number: 4,778,222

[45] Date of Patent: Oct. 18, 1988

[54] AUTOMOTIVE ANTI-LOCK BRAKE CONTROL SYSTEM

[75] Inventors: Kenichi Numata, Chiryu; Hiromi Otsuki, Anjo; Naohiko Tsuru, Okazaki; Noboru Noguchi, Toyota; Nobuyasu Nakanishi, Toyota, all of Japan

[73] Assignees: Nippondenso Co., Ltd., Kariya; Toyota Jidosha Kabushiki Kaisha, Toyota, both of Japan

[21] Appl. No.: 497

[22] Filed: Jan. 5, 1987

[30] Foreign Application Priority Data

Jan. 7, 1986 [JP] Japan .................................... 61-1142

[51] Int. Cl.$^4$ ................................................ B60T 8/28

[52] U.S. Cl. .................................... 303/9.73; 303/116

[58] Field of Search .................... 188/181 A; 303/6 C, 303/116

[56] References Cited

U.S. PATENT DOCUMENTS 4,421,361 12/1983 Arikawa et al. ................ 303/116 X 4,453,782 6/1984 Arikawa et al. .................... 303/116

4,523,792 6/1985 Belart et al. .................... 303/116 X 4,585,281 4/1986 Schnürer ............................ 303/116

FOREIGN PATENT DOCUMENTS 2610585 9/1977 Fed. Rep. of Germany .

*Primary Examiner*—Duane A. Reger

*Attorney, Agent, or Firm*—Cushman, Darby & Cushman

[57] ABSTRACT

An automotive anti-lock brake control system includes first and second directional control valves selectively shiftable between a first position in which a master cylinder communicates with first and second wheel cylinders associated with front and rear wheels, respectively, and a second position in which the first and second wheel cylinders communicate with a reservoir. A proportional valve is disposed between the master cylinder and the second directional control valve for producing a fluid pressure difference between the first and second wheel cylinders. The brake fluid stored in the reservoir is pumped by a fluid pump back to a pipe portion between the master cylinder and the proportional valve.

6 Claims, 2 Drawing Sheets

1
4
4a
4b
2
6
8
32
12
P4
P3
56
PROPORTIONAL VALVE
10
ACCUMULATOR
12
50
38
22
18
54
34
34c
40
42
34a
34b
24
26
18a
18b
18c
48
44
28
52
30
36
20
20
12
10
46
P1
W/C
16
W/C
14

AUTOMOTIVE ANTI-LOCK BRAKE CONTROL SYSTEM

BACKGROUND OF THE INVENTION

The present invention relates to an automotive anti-lock brake control system for preventing locking of the wheels of an automobile when the automobile is braked.

FIG. 2 of the accompanying drawings illustrates a conventional automotive anti-lock brake control system. In the illustrated earlier automotive anti-lock brake control system, a master cylinder 101 is connected to front and rear wheel cylinders 102, 103 by pipes 104, 105, respectively, which have three-position directional control valves 106, 107, respectively. The three-position directional control valves 106, 107 are of a known structure having three selectable positions, i.e., a communicating position in which the master cylinder 101 communicates with the wheel cylinders 102, 103, a cutoff or neutral position in which the master cylinder 101 is out of communication with the wheel cylinders 102, 103, and a return position in which the wheel cylinders 102, 103 communicate with a reservoir 108. Between the three-position directional control valve 107 and the rear wheel cylinder 103, there is provided a known proportional valve 109 for developing a hydraulic pressure difference between the hydraulic pressure supplied to the front wheel cylinder 102 and the hydraulic pressure supplied to the rear wheel cylinder 103. The hydraulic brake fluid is pumped from the reservoir 108 by a hydraulic pump 110 and the hydraulic pressure from the pump 110 is stored in an accumulator 111.

When the anti-lock brake control system starts to operate, the three-position directional control valves 106, 107 are switched between the three positions for changing the hydraulic pressure in the wheel cylinders 102, 103 thereby to prevent the wheels from being locked. Since these directional control valves 106, 107 switch very quickly, large pressure variations or pulsations are repeated in those portions of the pipes which are located downstream of the valves 106, 107 with respect to the direction of fluid flow from the master cylinder 101. The proportional valve 109 is supplied with the brake fluid pressure (input pressure) from the directional control valve 107 and supplies the rear wheel cylinder 103 with an optimum brake fluid pressure (output pressure) according to the input fluid pressure applied to the proportional valve 109. When the fluid pressure downstream of the directional control valve 107, e.g., at a position P1, is subjected to repeated frequent variations, the proportional valve 109 is also caused to repeat its proportioning operation (described above) as frequently. As the number of cycles the proportional valve 109 undergoes is increased, its durability and hence service life tend to be reduced relatively soon.

As shown in FIG. 3, the proportional valve 109 develops a pressure hysteresis characteristic between its input pressure at the position P1 (FIG. 2) and its output pressure at a position P2. Therefore, even after the directional control valve 107 is shifted to the return position and the input pressure is reduced, the output pressure is not reduced immediately but remains as it is for a certain period of time. This leads to a problem in that the timing for lowering the pressure in the wheel cylinder 103 is delayed.

SUMMARY OF THE INVENTION

It is therefore an object of the present invention to provide an automotive anti-lock brake control system having a proportional valve of improved durability.

Another object of the present invention is to provide an automotive anti-lock brake control system which prevents the timing for reducing hydraulic pressure in a wheel cylinder from being delayed due to pressure hysteresis caused by a proportional valve.

According to the present invention, a proportional valve for developing a fluid pressure difference between wheel cylinders associated with front and rear wheels of an automobile is connected between a master cylinder and a directional control valve connected to the wheel cylinder associated with the rear wheel. Brake fluid stored in a reservoir is returned by a fluid pump to a pipe portion between the master cylinder and the proportional valve.

BRIEF DESCRIPTION OF THE DRAWINGS

The present invention will be described in detail by way of illustrative example with reference to the accompanying drawings, in which.

DETAILED DESCRIPTION

Figure 1:
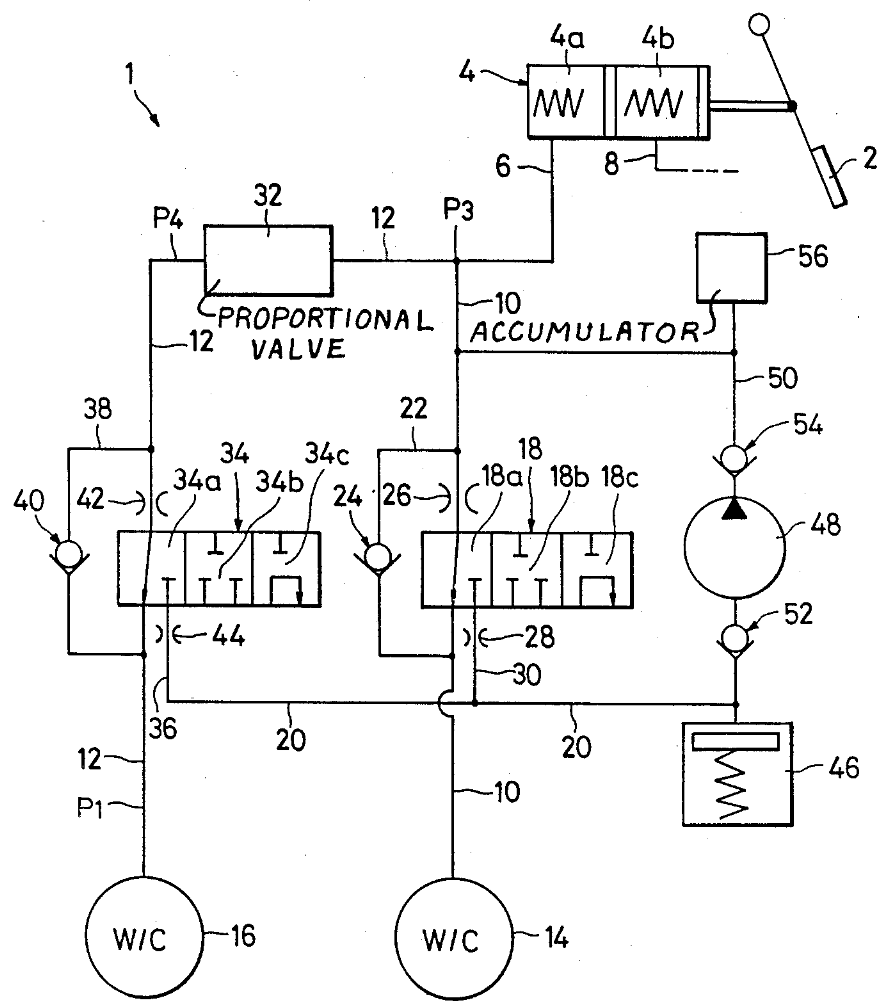
FIG. 1 is a schematic diagram of an automotive anti-lock brake control system according to the present invention.
Figure 2:
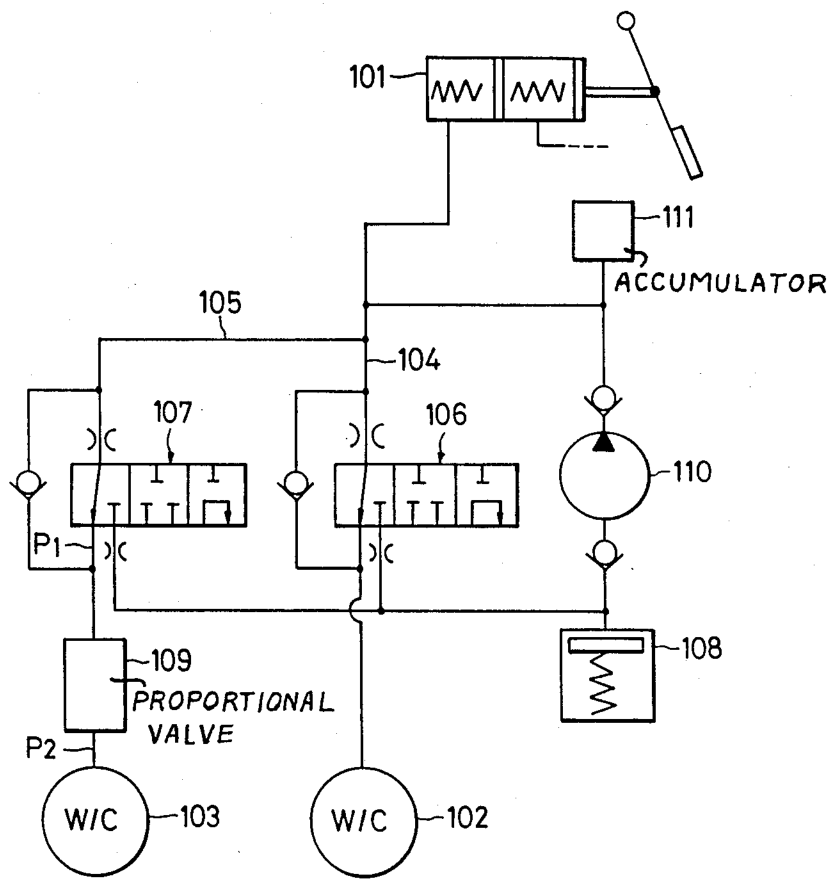
FIG. 2 is a schematic diagram of a conventional automotive anti-lock brake control system.
Figure 3:
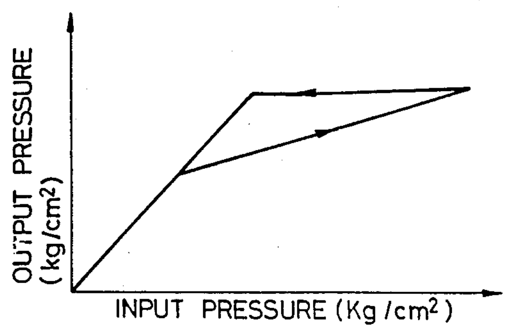
FIG. 3 is a graph showing a characteristic curve of a proportional valve employed in the automotive anti-lock brake control system.

FIG. 1 shows an automotive anti-lock brake control system, generally designated by the reference numeral 1, according to the present invention. The automotive anti-lock brake control system includes a master cylinder 4 for producing brake fluid pressure in response to depression of a brake pedal 2 by the driver's foot. The master cylinder 4 has two chambers **4*a*, 4*b* connected to main pipes 6, 8, respectively. The main pipes 6, 8 are coupled to identical hydraulic components, and hence only those connected to the main pipe 6** will be described hereinbelow.

The main pipe 6 is branched into two branch pipes 10, 12 connected to front and rear wheel cylinders 14, 16, respectively. The branch pipe 10 has a three-position directional control valve 18 of a conventional design. The three-position directional control valve 18 has a communicating position **18*a* in which the master cylinder 4 communicates with the wheel cylinder 14 through the branch pipe 10, a cutoff or neutral position 18*b* in which the master cylinder 4 is out of communication with the wheel cylinder 14, and a return position 18*c* in which a portion of the branch pipe 10 downstream of the directional control valve 18 is connected to a return pipe 20**.

To the branch pipe 10, there is connected a bypass pipe 22 in bypassing relation to the directional control valve 18, i.e., between a side of the directional control valve 18 (upstream side) which is connected to the master cylinder 4 and a side of the directional control valve 18 (downstream side) which is connected to the wheel cylinder 14. The bypass pipe 22 has a check valve 24 for allowing the brake fluid to flow only from the downstream side to the upstream side. The bypass pipe 22 serves to allow the brake fluid to return quickly from the wheel cylinder 14 to the master cylinder 4 while bypassing the directional control valve 18 when the brake pedal 2 is released from the driver's foot.

A fixed restriction 26 is disposed in the pipe 10 upstream of the directional control valve 18. Another fixed restriction 28 is disposed in a branch pipe 30 interconnecting the directional control valve 18 and the return pipe 20.

The branch pipe 12 has a proportional valve 32 disposed immediately downstream of the position in which the branch pipes 10, 12 are branched from the main pipe 6. The proportional valve 32 is of a conventional construction which is identical in structure and operation to the proportional valve 109 shown in FIG. 1.

The branch pipe 12 also has a three-position directional control valve 34 positioned downstream of the proportional valve 32. The three-position directional control valve 34 is identical in structure and operation to the three-position directional control valve 18. More specifically, the directional control valve 34 has a communicating position 34*a* in which the master cylinder 4 communicates with the wheel cylinder 16 through the branch pipe 12, a cutoff or neutral position 34*b* in which the master cylinder 4 is out of communication with the wheel cylinder 16, and a return position 34*c* in which a portion of the branch pipe 12 downstream of the directional control valve 34 is connected to the return pipe 20 through a branch pipe 36.

To the branch pipe 12, there is connected a bypass pipe 38 in bypassing relation to the directional control valve 34, i.e., between upstream and downstream sides of the directional control valve 34. The bypass pipe 38 has a check valve 40 for allowing the brake fluid to flow only from the downstream side to the upstream side. A fixed restriction 42 is disposed in the pipe 12 upstream of the directional control valve 34. Another fixed restriction 44 is disposed in the branch pipe 30.

The return pipe 20 is coupled to a reservoir 46 for storing the brake fluid that has returned from the wheel cylinders 14, 16 through the branch pipes 10, 12, the directional control valves 18, 34, the branch pipes 30, 36, and the return pipe 20. The brake fluid stored in the reservoir 46 is pumped out by a hydraulic pump 48 and delivered via a reflux pipe 50 back to the upstream side of the directional control valve 18 and the proportional valve 32. The reflux pipe 50 interconnects the reservoir 46 and the portion of the branch pipe 10 which is upstream of the directional control valve 18. The reflux pipe 50 has the pump 48 and check valves 52, 54 positioned respectively on opposite sides of the pump 48. An accumulator 56 is connected to the reflux pipe 50 on the outlet side of the pump 48 for storing the brake fluid from the pump 48 under constant pressure.

Each of the three-position directional control valves 18, 34 is a solenoid-operated valve. The hydraulic pump 48 is actuated by an electric motor (not shown). A speed sensor (not shown) is disposed near each of the wheels (not shown) with which the wheel cylinders are associated, for detecting the speed of rotation of the wheel. A signal produced by the speed sensor and indicative of the wheel speed is applied to an electronic control unit (ECU), not shown, which supplies driving signals to the three-position directional control valves 18, 34 and the electric motor of the pump 48.

Operation of the automotive anti-lock brake control system 1 is as follows:

For braking the automobile, the brake pedal 2 is depressed to enable the master cylinder 4 to produce a brake fluid pressure which is transmitted through the main pipe 6, the branch pipes 10, 12, and the three-position directional control valves 18, 34 to the wheel cylinders 14, 16. At this time, the directional control valves 18, 34 are in the communicating or first positions 18*a*, 34*a*, respectively. The center of gravity of the automobile is shifted in a forward direction when the automobile is braked. Therefore, the rear wheels would be apt to slip on the road. To prevent the rear wheels from slipping, the proportional valve 32 operates to reduce the fluid pressure to be applied to the rear wheel cylinder 16.

As the brake pedal 2 is continuously depressed, the fluid pressure in the wheel cylinders 14, 16 is increased. When the wheels being braked are locked or about to be locked, such a condition is sensed by the speed sensors, which apply signals to the ECU that issues driving command signals to actuate the pump 48 and shift the directional control valves 18, 34 to the return or second positions 18*c*, 34*c*, respectively. The brake fluid under pressure in the wheel cylinders 14, 16 is now directed by the directional control valves 18, 34 through the return pipe 20 to the reservoir 46, whereupon the wheels are unlocked and resume their rotation. When the speed of rotation of the wheels rises in excess of a predetermined reference speed, the ECU controls the directional control valves 18, 34 to be shifted to the communicating positions 18*a*, 34*a*, respectively, for thereby supplying the brake fluid under pressure from the pump 48 to the wheel cylinders 14, 16 to suppress the rotation of the wheels. The ratio at which the fluid pressure is increased in the wheel cylinders 14, 16 can be determined by shifting the directional control vâlves 18, 34 back and forth between the communicating positions 18*a*, 34*a* and the cutoff positions 18*b*, 34*b* at a suitable rate.

The anti-lock brake control mode is effected by repeating the aforesaid switching movement of the directional control valves 18, 34. The upstream side of the proportional valve 32, such as indicated by the point $P_3$ (FIG. 1), is supplied with a substantially constant fluid pressure from the pump 48, whereas the downstream side of the proportional valve 32, such as indicated by a point P4, is also kept under a substantially constant fluid pressure. Accordingly, once the proportional valve 32 determines its operating position for proportioning operation, it substantially remains in its operating position during the anti-lock brake control mode irrespective of pressure variations or fluctuations on the downstream side, such as indicated by the point P1, of the directional control valve 34. Since the proportional valve 32 is not subjected to large repeated pressure variations, its durability and service life are not unduly reduced. Furthermore, the timing of reducing the fluid pressure in the wheel cylinder 16 is not delayed inasmuch as the proportional valve 32 is not disposed between the wheel cylinder 16 and the directional control valve 34.

In the above embodiment, the directional control valves 18, 34 are simultaneously shifted in the anti-lock brake control mode. However, when only the front wheels or the rear wheels are locked, only the directional control valve associated with the front wheels or the rear wheels may be controlled for its switching operation.

Although a certain preferred embodiment of the present invention has been shown and described in detail, it should be understood that various changes and modifications may be made therein without departing from the scope of the appended claims.

We claim:

1. An automotive anti-lock brake control system for front and rear automotive wheels, comprising:

a master cylinder for generating a brake fluid pressure in response to an operation of a brake actuating member;

first and second wheel cylinders for braking the front and rear automotive wheels;

a piping interconnecting said master cylinder and said first and second wheel cylinders;

a reservoir for storing a brake fluid;

first and second directional control valves disposed in said piping and selectively shiftable between a first position in which said master cylinder communicates with said first and second wheel cylinders and a second position in which said first and second wheel cylinders communicate with said reservoir;

proportional valve means, disposed in said piping between said master cylinder and said second directional control valve for producing a fluid pressure difference between said first and second wheel cylinders, said proportional valve means having an inlet and an outlet and adjusting a pressure at the inlet by an amount of said fluid pressure difference to thereby derive an adjusted pressure at the outlet, the adjusted pressure being outputted from the proportional valve means via the outlet; and a pump for delivering the brake fluid stored in said reservoir to a portion of said piping between said master cylinder and the inlet of said proportional valve means.

2. An automotive anti-lock brake control system according to claim 1, wherein said piping includes a main pipe connected to said master cylinder and two branch pipes branched from said main pipe and connected to said first and second directional control valves, respectively.

3. An automotive anti-lock brake control system according to claim 2, wherein said proportional valve means is disposed in one of said branch pipes which is connected to said second wheel cylinder.

4. An automotive anti-lock brake control system according to claim 1 further comprising a restriction disposed in a portion of said piping between the outlet of the proportional valve means and the second directional control valve.

5. An automatoive anti-lock brake control system according to claim 1 further comprising an accumulator, coupled to an outlet of said pump, for storing the brake fluid from the pump under a constant pressure.

6. An automotive anti-lock brake control system for front and rear automotive wheels, comprising:

a master cylinder for generating a brake fluid pressure in response to an operation of a brake actuating member;

first and second wheel cylinders for braking the front and rear automotive wheels;

a piping interconnecting said master cylinder and said first and second wheel cylinders;

a reservoir for storing a brake fluid;

first and second directional control valves disposed in said piping and selectively shiftable between a first position in which said master cylinder communicates with said first and second wheel cylinders and a second position in which said first and second wheel cylinders communicate with said reservoir;

proportional valve means, disposed in said piping between said master cylinder and said second directional control valve, for producing a fluid pressure difference between said first and second wheel cylinders, the proportional valve means having an inlet and an outlet, the proportional valve means lowering a pressure at the inlet by an amount of said fluid pressure difference to thereby derive a lowered pressure at the outlet, the lowered pressure being output from the proportional valve means via the outlet;

a pump for delivering the brake fluid stored in said reservoir to a portion of said piping between said master cylinder and the inlet of said proportional valve means; and a restriction disposed in a portion of said piping between the output of the proportional valve means and the second directional control valve.

* * * * *